United States Patent [19]
Colyer et al.

[11] Patent Number: 6,151,621
[45] Date of Patent: Nov. 21, 2000

[54] PERSONAL CONFERENCING SYSTEM

[75] Inventors: Adrian Mark Colyer; Andrew Key; Vince Sethi, all of Southampton, United Kingdom

[73] Assignee: International Business Machines Corp., Armonk, N.Y.

[21] Appl. No.: 09/044,459

[22] Filed: Mar. 19, 1998

[30] Foreign Application Priority Data

Apr. 10, 1997 [GB] United Kingdom ............... 9707316

[51] Int. Cl.[7] ............... G06F 13/38; G06F 15/17
[52] U.S. Cl. ............... 709/204; 709/201; 709/203; 709/205; 709/208; 709/209; 709/217; 709/227; 709/304; 345/1; 345/330; 345/331; 370/260
[58] Field of Search ............... 709/204, 205, 709/201, 203, 208, 209, 217, 227, 304; 370/260; 345/330, 1, 331; 710/110; 711/1; 340/825.01, 825.04, 825.02, 825.03

[56] References Cited

U.S. PATENT DOCUMENTS

| | | | |
|---|---|---|---|
| 5,293,619 | 3/1994 | Dean et al. | 395/650 |
| 5,319,777 | 6/1994 | Perez et al. | 395/600 |
| 5,392,400 | 2/1995 | Berkowitz et al. | 395/200 |
| 5,452,299 | 9/1995 | Thessin et al. | 370/62 |
| 5,535,332 | 7/1996 | Ishida | 395/200.01 |
| 5,652,789 | 7/1997 | Miner et al. | 379/201 |
| 5,694,544 | 12/1997 | Tanigawa et al. | 395/200.04 |
| 5,729,687 | 3/1998 | Rothrock et al. | 709/204 |
| 5,745,688 | 4/1998 | Oka | 709/204 |
| 5,757,669 | 5/1998 | Christie et al. | 364/514.006 |
| 5,764,902 | 6/1998 | Rothrock | 709/205 |
| 5,802,518 | 9/1998 | Karaev et al. | 707/9 |
| 5,844,969 | 12/1998 | Goldman et al. | 379/93.24 |
| 5,867,494 | 2/1999 | Krishnaswamy et al. | 370/352 |
| 5,872,924 | 2/1999 | Nakayama et al. | 709/205 |
| 5,881,233 | 3/1999 | Toyoda et al. | 709/218 |
| 5,887,170 | 3/1999 | Ansberry et al. | 395/687 |
| 5,907,324 | 5/1999 | Larson et al. | 345/330 |
| 5,907,598 | 5/1999 | Mandalia et al. | 379/100.01 |
| 5,915,001 | 6/1999 | Uppaluru | 379/88.22 |
| 5,920,694 | 7/1999 | Carleton et al. | 709/205 |
| 5,923,848 | 7/1999 | Goodhand et al. | 709/219 |
| 5,933,597 | 8/1999 | Hogan | 709/204 |
| 5,937,160 | 8/1999 | Davis et al. | 709/203 |
| 5,938,723 | 8/1999 | Hales, II et al. | 709/204 |
| 5,963,547 | 10/1999 | O'neil et al. | 370/260 |
| 5,978,835 | 11/1999 | Luidwig et al. | 709/204 |
| 5,995,491 | 11/1999 | Richter et al. | 370/263 |
| 5,996,003 | 11/1999 | Namikata et al. | 709/205 |

FOREIGN PATENT DOCUMENTS

| | | | |
|---|---|---|---|
| 0319232 | 6/1989 | European Pat. Off. | G06F 15/40 |
| 0497022 | 8/1992 | European Pat. Off. | G06F 15/40 |
| 0645726 | 3/1993 | European Pat. Off. | G06F 17/60 |
| 0645725 | 3/1995 | European Pat. Off. | G06F 17/60 |
| 0657833 | 6/1995 | European Pat. Off. | G06F 17/60 |
| 2281423 | 3/1995 | United Kingdom | G06F 9/46 |
| WO94/11806 | 5/1994 | WIPO | G06F 3/14 |
| WO96/12241 | 4/1996 | WIPO | G06F 17/60 |

OTHER PUBLICATIONS

David J. Wetherall et al., The Active IP option, the 7th ACM SIGOPS European Workshop/http://www.tns.lcs.mit.edu/, 8 pages, Sep. 1996.

*Primary Examiner*—Frank J. Asta
*Assistant Examiner*—Bunjob Jaroenchonwanit
*Attorney, Agent, or Firm*—Jerry W. Herndon

[57] ABSTRACT

There is described a personal conferencing method and system for a client (32)/server (30) environment. The server (30) stores conference model data (60) such as a shared chalkboard or a molecular model and each client has a copy of the conference model data (61). When one of said clients (32A, 32B, 32C) edits the model (61) it creates an instruction (64A) for operating on the model and sends the instruction (64A) to the server (30). The server (30) operates (62) on its conference model data (60) on receipt of the instruction (64A) and resends the instruction (64B) to each of the clients (32A, 32B, 32C) and each client (32A, 32B, 32C) performs the same operation (63) on their respective copies of the conference data model (61). Whereby after a plurality of different operating instructions (64B) from different clients (32A, 32B, 32C) the respective copies of the conference model data (60) are equivalent.

18 Claims, 5 Drawing Sheets

PERSONAL CONFERENCING SYSTEM

FIELD OF THE INVENTION

This invention relates to a personal conferencing system.

BACKGROUND OF INVENTION

Personal computer conferencing allows a computer user to participate in a meeting from his own desk instead of travelling to a location mutually convenient to all parties. Just as telephony systems have developed to include conference calls to more than two parties so have computer systems developed to allow large numbers of networked computer users to participate in a single conference. An example of personal conferencing is an internet 'chat room' in which one can conduct meetings in text or voice in real time with other computer users.

A development of the 'chat room' type conference is the application type conference in which Personal Conferencing systems try to allow a number of participants to share applications so that they can all interact with them and see the same results. One example of this is the 'white board' application in which participants can draw on a 'common' white board and see and edit the same drawing. Another example is a molecular modelling application in which each participant may change and manipulate a molecule displayed on the computer screen.

Some Personal Conferencing Systems are implemented in a peer-to-peer fashion. An example of this are the PM2PM and Person to Person/2 products developed by IBM Corporation. In this environment, for example (see FIG. 1) a conference management/call manager program (18A, 18B) runs in each computer (10A, 10B) drawing upon the services of one or more network adaptors (12A, 12B) to communicate over a network (14). A number of specially written personal conferencing applications (16A, 16B, 16C) connect to the conference management. If a conference includes a shared chalkboard, for example, then on each participating node chalkboard personal conferencing applications (16A, 16B, 16C) will be running. These applications send packets of data to each other, utilising the services of the conference management program (18A, 18B).

This arrangement has the following drawbacks:

(i) As the conferencing management program is not responsible for ensuring that the data in the application on each node corresponding to the same shared chalkboard (or other data) is the same, the applications must invent and use a protocol between them for doing so.

(ii) Each node may elect to not store an entirely identical copy of the data which its peers do. This design decision is often made in error, as it tends to expedite a rapid implementation, with the side effects not being immediately apparent.

(iii) If a new participant joins the conference, then a copy of the data in the chalkboard (or other data) must be transmitted from one of the nodes. If the data on each node is not identical, then which data is best sent? For an efficient transfer, the application may need an appreciation of the network geography, further complicating the implementation of the application. When a new participant joins the conference, and wishes to share an existing application he must be brought into step.

(iv) All this extra complication in the applications (peer-to-peer protocol to keep data in step, joining and leaving transfer, knowledge of geography) must be duplicated in each sort of application.

(v) A person may not indicate their readiness to participate in a conference on their own, as there is no 'meeting point' inherent in the system. There is no server which can reasonably expect to be powered up at any time, in a purely peer-to-peer system.

An example of personal conferencing which does not allow manipulation of shared data by either party, is simplified Peer-to-Peer such as the shared whiteboard application in the NeWI environment developed by Data Connection Limited. The whiteboard has multiple planes, one per participant. Each participant can draw upon his own plane, and changes to his plane is transmitted to the other participants, who can then see (but not change) the new plane. As nobody can change the picture on the plane of another, there is no shared manipulation of shared data. 'NeWI' is a trademark of Data Connection Limited.

Simplified Peer-to-Peer has further disadvantages. Although in the example of a shared whiteboard some utility is afforded by such a tool, most of the value is in the shared manipulation of data. Although this system is simple to implement, this style of 'conferencing' is awkward for text editing and other forms of shared manipulation.

One of the main problems of peer-to-peer conferencing systems is therefore that of serialisation, the requirement that all the data must arrive at all the destinations/nodes in the same order to preserve the conference model integrity. The order used is normally the order in which the data is sent.

A different type of personal conferencing is provided by the XTV system developed by IBM Corporation. This is an enhancement/modification of the XWindows system. If the input events (mouse-clicks, keystrokes etc.) from a variety of participants can be transmitted to a given machine, applied to a running program, and the resulting changes to the screen (or windows of the program) transmitted back to the participants, a rudimentary form of personal conferencing can be achieved.

XWindows is a client-server system, whereby the servers serve the ability to provide user input, and also serve the ability to draw to their screen. Typically each user has an Xserver (20) running on their machine and the data-stream is sent to the Xserver (20) via an XTV interceptor (22) to get it to display graphics using X-protocol. As XWindows is client-server, and X-protocol is transmitted between them, it is usual for clients and servers to be running in different machines. XWindows implies networking, and this is handy when collaborative working is desired (as in personal conferencing). For output, XTV (22) intercepts the X-protocol sent by an application running on a client (24) to a server (26). It fans this data out to a number of Xservers (20), thus making the programs windows visible to a number of participants. Similarly, input is drawn from a number of Xservers (20), and channelled in to the machine running the shared (multiply accessible) application. XTV and XWindows are trademarks of IBM Corporation.

Normal XWindows client-server interaction is shown in FIG. 2A and Interaction with XTV (22) 'in the middle' is shown in FIG. 2B. XTV (22) routes input and output traffic between a number of applications and servers and has the advantage of working with all existing non-collaborative applications.

However, it has the following drawbacks:

(i) Its not a collaborative application 'enabler'.

(ii) Non-collaborative applications are written with one user in mind and keystrokes and mouseclicks are from a variety of users, all interleaved in time.

(iii) All users can only see an identical view of the data. eg: User one cannot see a zoomed view of the chalkboard, whilst user two sees the normal size.

(iv) Changes to the application data can result in large quantities of screen changes (and thus X-protocol), and this problem is made worse by the fact that it is now sent to all the participants.

(v) The application is really only running on one machine, and so the data it holds is only accessible on that machine unless all the machines share a common file-system (such as AFS or DFS). Even if machines share access to a common file-system, drive letters and pathnames may be different across machines, for the same file. Generally, when manipulation remote data, you (the user) have to consider that you are running on the remote machine. This is added complexity for the user.

Another problem of most types of Personal Conference system is that no attempt has been made to optimize the network performance by choosing the nearest (network speed wise) existing participant to the new participant. Commonly, personal conference systems have transmitted the data from an arbitrary existing node to a new node.

EP0497022 Hewlett-Packard relates to a distributed object-based computer system in which sharable objects are split into client and server components. It is designed for a number of servers which communicate amongst themselves to send messages and deliver updates.

The embodiment of the invention draws on a number of disciplines for its performance. One of these Model/View/Controller (or MVC for short) is a discipline used in implementing applications. Such an application is divided up into three logical parts, with clearly defined interfaces and responsibilities.

The Model is the data which the application is presenting and allowing to be manipulated. However the Model itself only contains the data and entrypoints (ie: methods) by which the data may be changed. The Model has no concept of how the data is to be presented to the user, and no concept of how a user indicates or is allowed to specify their intended change/modification of the data. In the example of a Chalkboard application, the Model could be a bitmap representing the picture. The Model would not include any concept of a current pen colour, fill style or font setting etc. Modification of the data in the Model is achieved through the entrypoints/methods, and the new state of the Model is determined entirely from the old state and the parameters to the entrypoint (ie: the entrypoints are pure, and do not use global data). In this description the entrypoints/methods are associated with operating on the data of the model or the 'means for operating'.

The View is the user-interface components for showing the user the current state of the Model. It determines how to display the model purely from the Model data it is configured to show, with access to no external or global variables. That is to say that given a particular Model, you will always get the same visual representation. In the example of a Chalkboard application, the View might chose to display the Models bitmap in the client area of a window, with scrollbars.

The Controller is the user-interface components for allowing the user to specify changes to the Model. In the example of a Chalkboard application, the Controller is responsible for showing the rubberbanding which occurs when the user decides to draw a rectangle (or other graphic symbol) on the Chalkboard. The Controller does not directly modify the Model (eg: draw the rectangle)—rather it calls entrypoints in the Model to get this job done. The Controller can maintain the users current choice of pen colour and font, and this information is passed as a part of a draw-rectangle command passed to the Model (in order that the change be completely specified). In this description the controller is associated with the creation of an operating instruction or the means for creating.

In the interests of efficiency, when a Model has changed, it may notify the View (or Views) of itself of the fact that it has changed, and perhaps the extent of the change. This allows the View to redraw itself to reflect the change, or even to selectively redraw the part of itself that has been affected.

In practice the distinction between Controller and View is often blurred. In the case of the Chalkboard, the same client window might both display the current View of the bitmap and the rubberbanding taking place due to the current user interaction with the Controller.

The embodiments of the present invention attempt to address these and other problems.

SUMMARY OF INVENTION

In one aspect of the invention there is provided a personal conferencing method for a server computer (30) having one or more client computers (32A, 32B, 32C) connected comprising the steps of:

(a) storing conference model data (60) on the server computer (30);

(b) operating (62) on the conference model data (60) on receipt of an instruction (64A) from a client computer;

(c) resending the instruction (64B) from the server computer (30) to each of the client computers (32A, 32B, 32C) whereby each client computer (32A, 32B, 32C) performs the same operation (62) on a copy of the conference data model held on the client computer so that all the copies of the conference data model (60) correspond to the conference model data held on the server computer.

Using a client/server configuration for a conferencing system in which each client has a conference model which is updated from the server rather than the client has clear advantages. A serialisation mechanism is provided which is essential for any (non-broken) personal conference system design. All editing messages pass through the server computer, on its way to the client computers, thereby providing a central serialization point. The server computer can promise to deliver data to all client computers in the same order which guarantees that all client computers display the same thing.

Further advantages are apparent. For instance, the design of a personal conferencing system is formalized and simplified through incorporating a Model/View/Controller configuration. Also intercepting changes to the conference model and distributing the change to the client computers is the simplest way of achieving corresponding screen views. In such a design the server computer is free of any user interface code.

The server computer itself provides a permanent 'meeting point', where clients can advertise their existence and willingness to participate in shared work. This advantage is particularly lacking in peer-to-peer systems.

According to a second aspect of the present invention there is provided a personal conferencing method for one or more client computers connected to a server computer comprising the steps of:

(a) each of said client computers storing a copy of conference model data;

(b) one of said client computers creating an instruction for operating on the conference model data and sending said instruction to the server computer;

(c) each of said client computers receiving a copy of the instruction from the server computer and operating on their respective models according to the instruction;

whereby after a plurality of different operating instructions from different clients the respective copies of the conference model data correspond with each other.

According to a third aspect of the present invention there is provided a personal conferencing system comprising at least two client computers and a server computer;

the server computer comprising:

conference model data;

means for receiving an instruction from a client computer and operating on the conference model data according to the instruction;

the client computer comprising:

means for creating an instruction and sending the instruction to the server computer;

characterised by:

the server computer further comprising means for dispersing a received instruction to all the client computer; and each of the client computers further comprising:

a copy of the conference model data;

means for receiving a dispersed instruction from the server computer and operating on the copy of the conference model data according to the instruction received from the server computer.

According to a fourth aspect of the present invention there is provided a personal conferencing system comprising at least two computers connected for message communication; each computer comprising:

conference model data;

means for creating an instruction for operating on the conference model data and sending the instruction to another computer;

means for operating on the conference model data according to an instruction;

characterised by:

one of the computers is a server computer and the other computer or computers are client computers, each having a connection to the server computer;

the server computers further comprises a means for dispersing a received instruction to all the connected client computers; and the means for operating comprises means for receiving a dispersed instruction from the server computer;

whereby a sequence of operating instructions from different computers in the personal conferencing system will be performed in the same order on each copy of conference model data.

According to a fifth aspect of the invention there is provided a personal conferencing system comprising:

a server object and a plurality of client objects;

a model object (36A) having model data (60) and means (62) for operating on the model data (60) to an instruction message (64B);

each client object (36) having means (36B) for creating an instruction for operating on the model object (36A);

characterised by:

each client object (36) comprising an associated model object (36A);

each client object (36) further comprises means (36B) for passing an operating instruction to the server object;

said server object (50) further comprises means (50B) for dispersing a passed instruction from the server object to all client objects (36);

thereby allowing a sequence of instructions from different client objects (36) to be performed in the same order by each model object on each instance of the model data (60).

Preferably the instruction is in the form of an Opcode having arguments. This is a convenient way of packaging modifications to the conference model data so that the modifications may be easily distributed from the client computer creating it to the server computer and from the server computer to all the client computers involved in the conference. Clearly if the same initial conference model data exists on a number of client computers, applying the same operation to all the copies of the conference model data will result in the same model.

Preferably the server computer sends a copy of the conference model data to a client computer who wishes to join the conference and makes such a request to the server computer. This enables new client computers to join the conference at any point and to receive an accurate and reliable copy of the conference proceedings at that point. In a preferred embodiment a blank template conference model is stored on the client computer and its state is changed to match the state of the conference model data held in the server.

In the preferred embodiment the methods that are performed in the server computer and the client computers are under the control of a hosted byte code such as JAVA. This allows cross platform portability of a conference. It is advantageous that the machine hosted byte code is downloadable from the server computer by a network browser running on the client computer. This allows easy connectivity by most computers already connected to the internet by real time downloading from the World Wide Web without the need for any pre-installed client code.

In the preferred embodiment each client computer graphically displays the conference model data on a computer screen. Each client computer may therefore adapt the particulars of the way in which the conference model data is displayed on its own screen, i.e. the view, while at the same time displaying the same conference model data as each of the other client computers.

In the preferred embodiment the server computer does not need to graphically display the conference model data but has a central role in the conference with responsibility for maintaining all the copies of the conference model data on the client computers. Centralised conference model data on the server computer may act as master and force all the client computers to be kept in step.

Hosted machine code is a platform independent code such as the byte code needed for the JAVA Virtual Machine. Hosted machine code such as JAVA byte code provides operating system/platform independence of applications and JAVA byte code is a programmable code that is executable on any JAVA enabled platform (an operating system having a JAVA executable environment or virtual machine) without recompilation. JAVA is a trademark of SUN MICROSYSTEMS CORPORATION.

BRIEF DESCRIPTION OF THE DRAWINGS

In order to promote a fuller understanding of this and other aspects of the present invention, an embodiment will now be described, by way of example only, with reference to the accompanying drawings in which.

DETAILED DESCRIPTION OF THE PREFERRED EMBODIMENT

Figure 1:
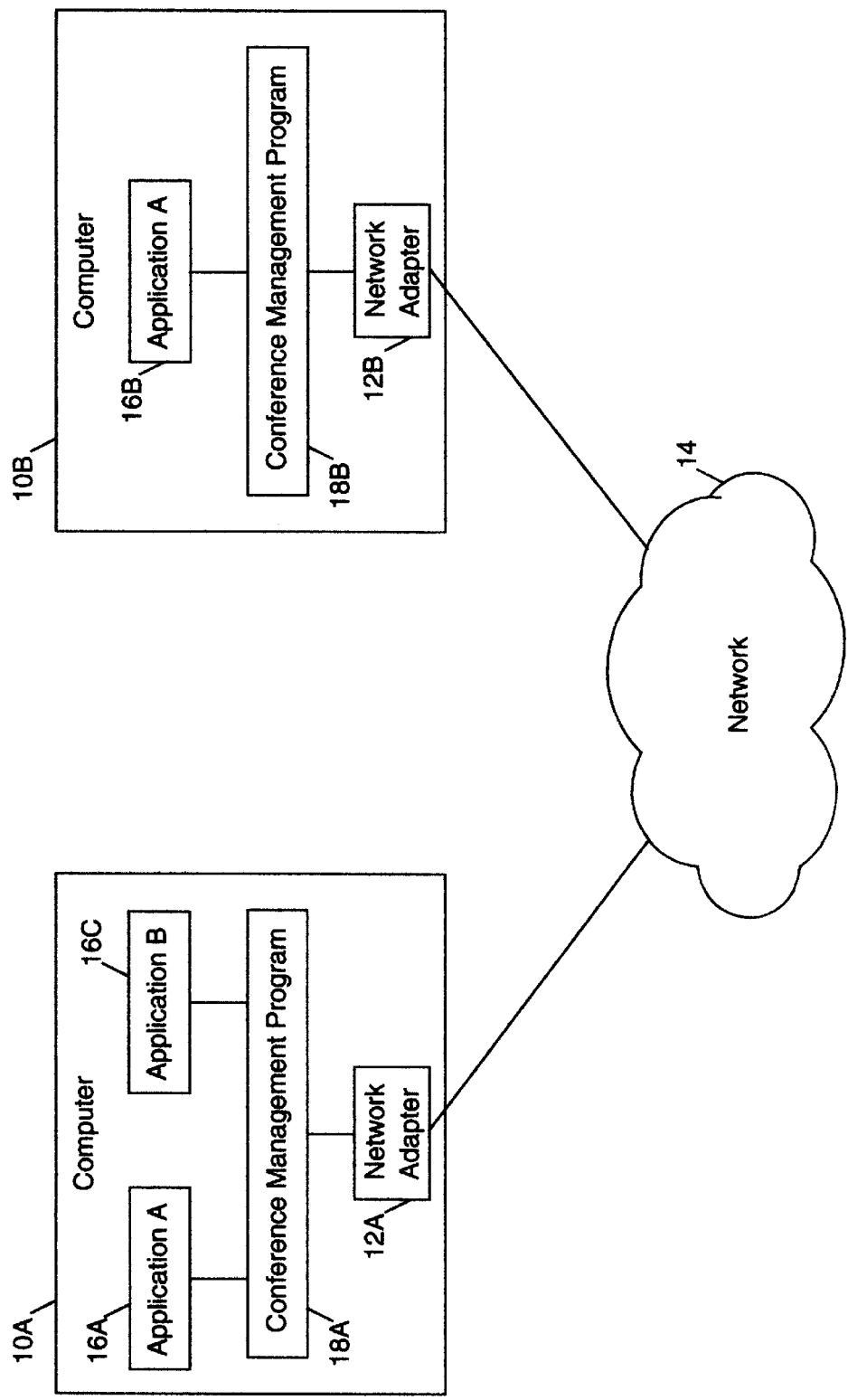
FIG. 1 is prior art example of a peer to peer conferencing system.
Figure 2A:
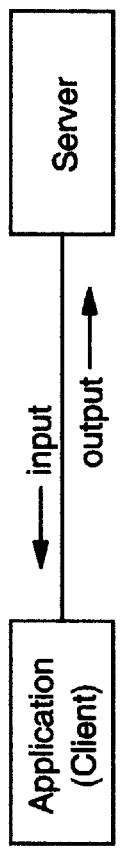
FIG. 2 is a prior art example of a client/server conferencing system.
Figure 2B:
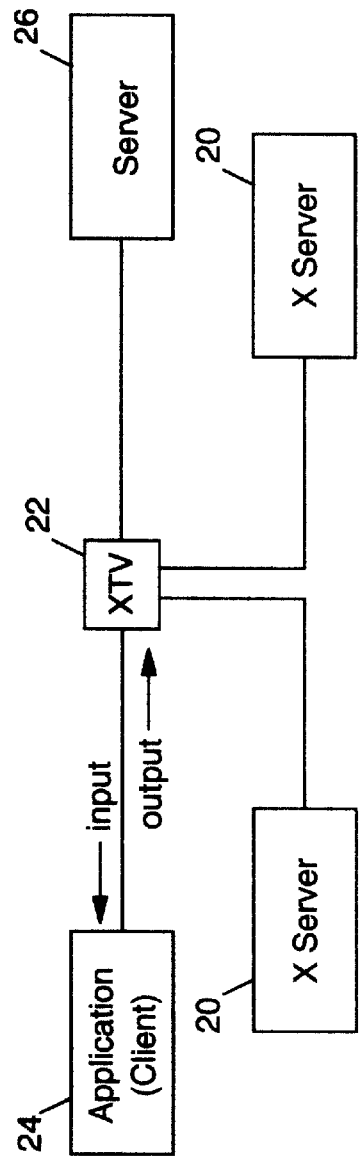
Figure 3:
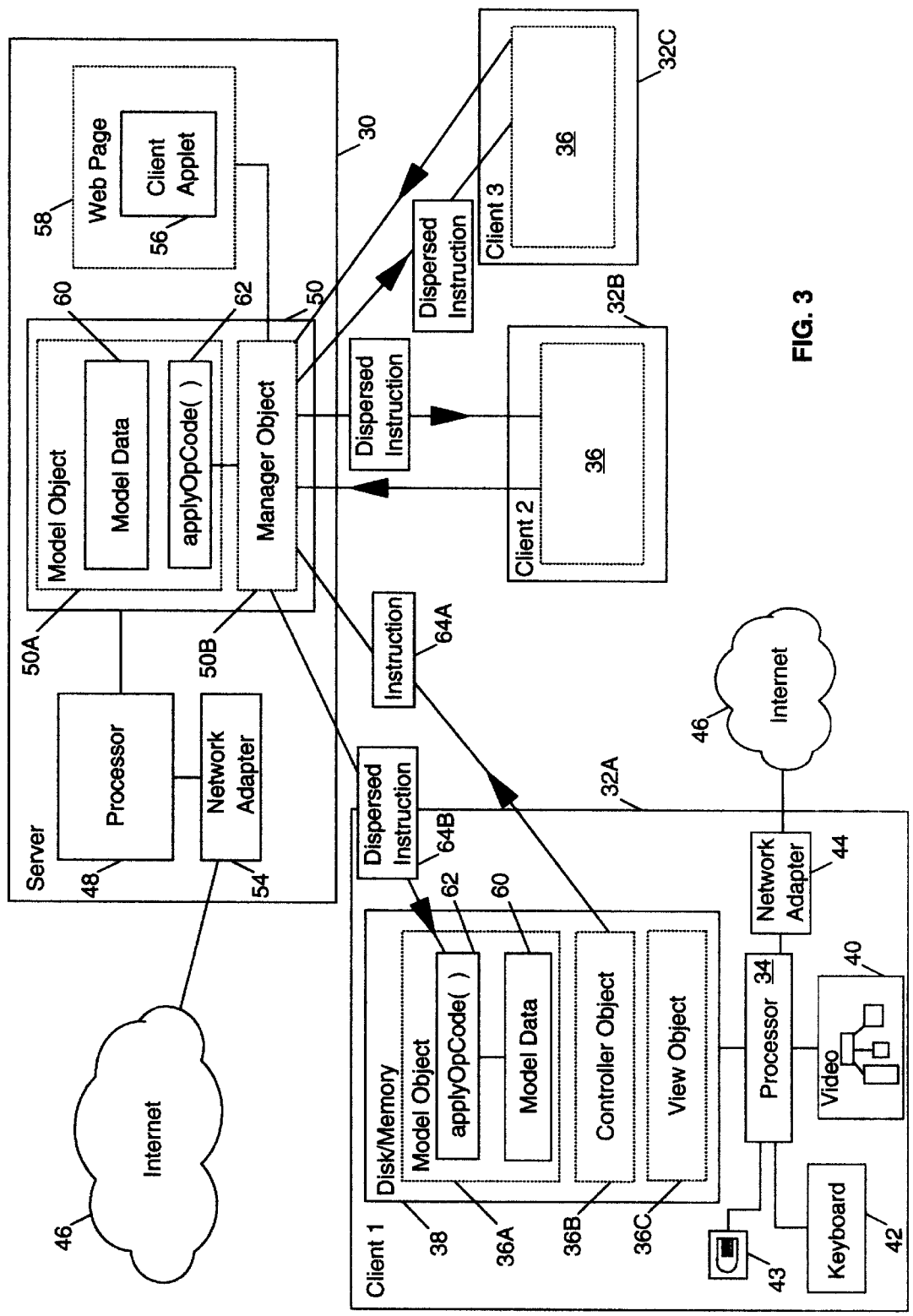
FIG. 3 is a schematic representation of the embodiment of the invention.

A client/server arrangement of the embodiment of the invention has a central server computer (30) connected directly to three client computers (32A, 32B, 32C) (see FIG. 3). A client computer (32A) comprises a processor (34) which performs under the instruction of client code (36A, 36B, 36C) (client program code) stored in memory (38) and/or on disk of a client computer. Visual output of the client computer (36A) is through a video peripheral (40) such as a monitor or LCD screen connected to the processor (34) and user input to the client computer (32A) is by a keyboard (42) and computer mouse (43) connected to the processor (34). The client computer further comprises a network adaptor (44) connected to the processor at one end and a computer network (46) at the other. Examples of two computer networks (46) are a corporate intranet and the internet. Examples of the client computer is IBM's Aptiva computer having a 486 133 Mhz micro processor, 1 Gbyte hard drive, 16 Mbytes of memory and a 16 inch monitor.

The server computer (30) comprises a processor (48) which performs under the instruction of server code (50A, 50B) (server programme code) stored in memory (50) and/or on disk of the server computer. Visual output is not strictly necessary but may be through a video peripheral such as a monitor or LCD screen connected to the processor (48) and user input is also not strictly necessary but would be through a keyboard or computer mouse connected to the processor (48). The server computer (30) further comprises a network adaptor (54) connected to the processor (48) at one end and the computer network (46) at the other. An examples of the client computer is IBM's RISC6000 computer having a Intel P200 Mhz micro processor, a 20 Gbyte hard drive and 64 Mbytes of memory.

Each instance of client code (36A, 36B, 36C) comprises three main parts: the conference model object (36A) (an instance of a ConferencingAppletModel class), the conference controller object (36B) (an instance of a ConferencingApplet Controller class) and the conference view object (36C) (an instance of a ConferencingAppletView class). The client code forms a client applet (56) which is contained within a World Wide Web page (58) stored on the server. There are as many instances of client code (36) as there are client computers (32A, 32B, 32C) and an instance of the client code is downloaded and stored on each client computer (32A, 32B, 32C).

To download or create an instance of client code on a client computer (32A) a computer having a JAVA enabled web browser connected to the internet is required; on accessing and viewing a conference web page (58) containing a client applet (56) the browser will copy the client applet (56) on to the client computer (32A). The applet (56) will normally execute upon download but may also execute after performing an event such as selecting a button icon displayed on the monitor (40) using the cursor and mouse (43).

The server code (50A, 50B) comprises two main parts: the conference manager object (50B) (an instance of a ConferencingSystemManager class) and the conference model object (50A) (an instance of the ConferencingAppletModel class). Other server objects used in the server code are: a ServerMain object (50C); a Connection object (50D); and a ServerMonitor object (50E) (see FIG. 4).

The ServerMain object (50C) listens for and accepts incoming network connections from clients. When a connection is received it creates an instance of the Connection class (50D). The ServerMain object also creates and owns a single ConferencingSystemManger object.

An instance (50B) of the Connection class is created whenever a network connection is accepted by the server so that for each client a Connection object exists. It represents a connection to an individual client. The Connection object (50D) runs a thread which continually listens for incoming messages from the client and passes them onto the ConferencingSystemManager class. The Connection object (50D) is also used for sending messages from the ConferencingSystemManager (50B) back out to the client.

The ConferencingSystemManager object (50B) is the object that manages concurrent multi-party conferences for the server. Each conference in progress is represented by an instance of the ConferencingAppletModel class (or to be precise, one of its subclasses). Each conference in progress identifies its model class by a "model id" which is passed on all messages.

The ServerMonitor object (50E) provides a graphical view of the activities of the ConferencingSystemManager (50B). It can be used by an administrator to monitor activity in the conferencing system.

The ConferencingAppletModel class (50A) is the super-class for all conference models. Each type of multi-party conference introduces its own subclass of ConferencingAppletModel. For example, there might be a ChatConferenceModel for chat applications, a ChalkboardConferenceModel for chalkboard applications and so on. The model object maintains the current state of the conference in the form of model data (60). It provides three important methods:

applyOpCode( ) (62)—applies an operand and its arguments (as received in a message from a client), to the model, which will cause the model's data (60) (state) to be updated.

setState( )—causes the model to set its data (60) (state) to that passed in the message getState( )—causes the model to generate a message containing its current state.

Figure 4:
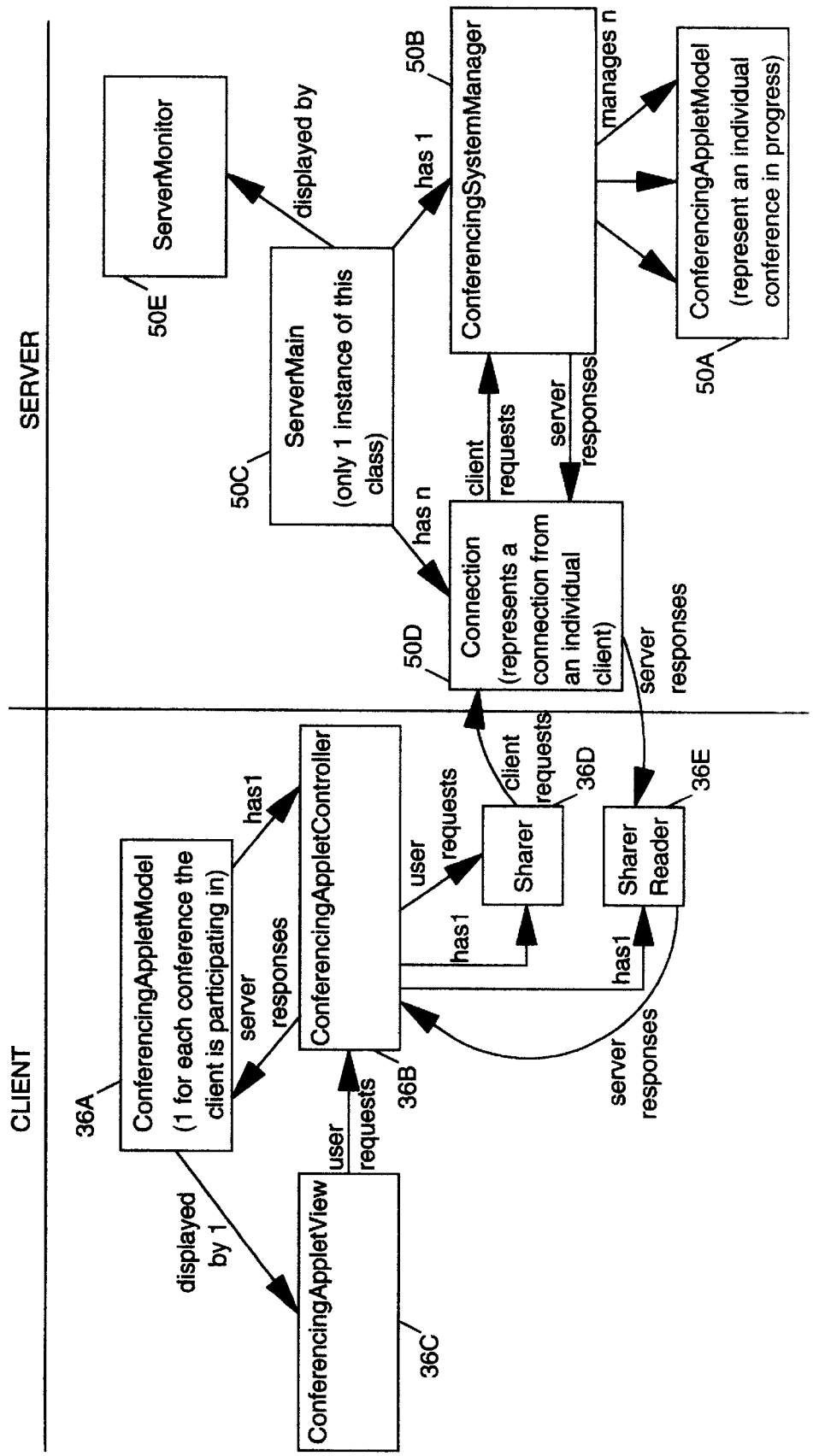
FIG. 4 is a schematic representation of the program classes used to implement the embodiment of the invention.

Other client objects used in the client code are: a Sharer object (36D) and a SharerReader object (36E) (see FIG. 4).

The ConferencingAppletModel object (36A) is the same object as used in the server, with subclasses as described above.

The ConferencingAppletView class is the superclass for all conference views (used to display the current state of the conference to the user—eg. the appends in a chat conference). Each type of conference introduces its own subclass of ConferencingAppletView. A view class instance (36C) is on one-to-one correspondence with a model. When the model's data (60) changes, it calls the "invalidate( )" method of the view which causes the view to redraw itself.

The ConferencingAppletController class is the superclass for all conference controllers (used to send messages to and read messages from the server) and forms a controller object (36B). Each type of conference introduces its own subclass of ConferencingAppletController. A controller object (36B) is in one-to-one correspondence with a view and a model. When user actions are initiated at the end-user interface, the view informs the controller of the action to be taken. The controller builds this into a message and sends it to the server (30). The server (30) then broadcasts the message to all controllers in the conference. Likewise, the controller listens for incoming messages from the server, and passes them to the model's applyOpcode( ) method (62) for evaluation.

The Sharer object (36D) is used by the ConferencingAppletController to establish a socket connection with the server, and then to send messages to it.

The SharerReader object (36E) is used by the ConferencingAppletController to listen for incoming messages from the server (30) and pass them to the model for evaluation.

The initialisation of the embodiment is as follows. The client computer (32A) under the control of a World Wide Web browser is instructed to view a page (58) containing the client applet (56). The page (58) may be meeting point for users wishing to participate in a certain type of conference. Upon viewing, the client applet (56) is downloaded to the client computer from the server (30) and when executed, instances of the client code are created including a ConferencingAppletModel object (36A), ConferencingAppletController object (36B), ConferencingAppletView object (36C), Sharer object (36D) and SharerReader object (36E). The client computer (32A) under the control of the Sharer object (36D) then attempts to establish a socket connect with the server object.

The server code (50A to 50E) for a particular conference is created as soon as a first client requests a connection for a conference that does not exist. When subsequent client computers attempt to establish a socket connection the ServerMain object (50C) creates an instance of the Connection class (50D) and associates it with that client computer. The ServerMain object (50C) determines the state of the model data (60) in the ConferencingAppletModel object (50A) by calling the getState (state) method which creates a message containing the (state). This message is sent by the Connection object (50D) in the server through the network connection to the client object (36A) where it is picked up by the SharerReader object (36E). The message is then passed on to the client's ConferencingAppletModel object (36A) which changes the state of its model data (60) to that sent in the message using its setState (state) method.

Once a client computer stores a current model data (60) it receives a constant flow of update messages comprising operation codes (Opcode) from the server (50A to 50D) requesting the conference model object (36A) to update itself using the applyOpCode (OpCode) method (62). The update messages continue as long as the conference is in progress. The server in fact sends the same update message (OpCode) to each of the clients connected for a particular conference. In this way, if all the conference model objects have the same model data at the start and receive the same message updates (OpCode) in the same sequence then, at any point in the conference, the model data (60) of any conference model object will match.

If a client wishes to partake in the conference by adding or editing the model data (60) then the changes to the model data (60) are expressed as an operation code by the conference controller object (36B) and sent to the conference manager object (50B) in the server computer (30). The conference manager object (50B) then disperses or resends the operation code as an update message to all the partaking client objects (36). Each conference model object (36A) receives the update message and each applyOpCode method (62) updates the each respective set of model data (60).

The conference model object (50A) of the server (30) also receives the update message and the applyOpCode( ) method (62) update the server object's model data (60).

An embodiment of the invention is IBM's TeamWorker application developed for a corporate intranet as an interactive team working environment. The model data (60) is the data used in a chalkboard application representing a two dimensional surface which may be written or drawn or painted on in many colours. FIG. 4 shows the interaction between the main classes in TeamWorker. The other classes in TeamWorker are used to implement particular conferencing applications on top of the TeamWorker infrastructure, and to provide a graphical front end from which those conferences can be launched.

Figure 5:
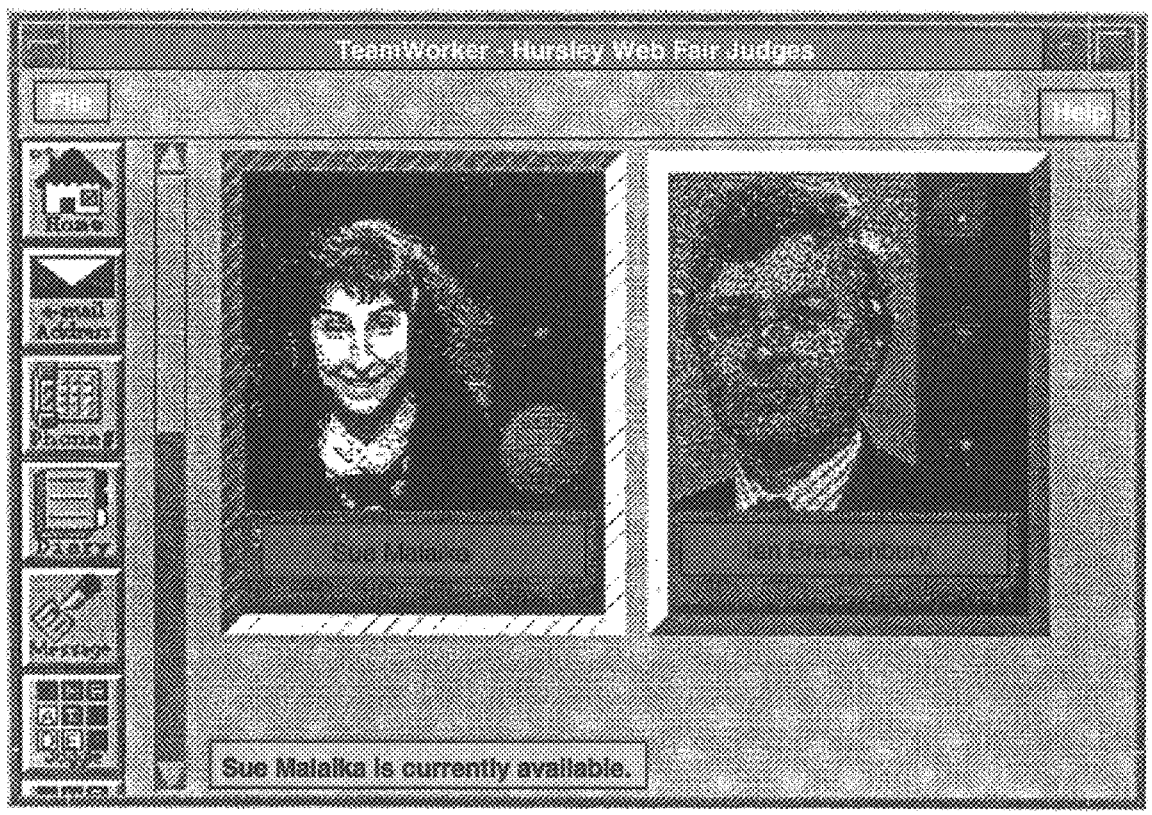
FIG. 5 is a representation of the computer screen for IBM's Teamworker application.

The main applet class (56) that is executed when it is downloaded to a browser. It creates the TeamWorkerWindow used to display the conferencing facilities to the user FIG. 5. TeamWorker has a concept of a "team", and each member of the team is represented by an instance of the TeamMemberModel class inside the applet. Every TeamMemberModel has a corresponding TeamMemberView which represents that team member within the main window by displaying their picture in a passport photograph sized window. To the left of the team members photos, a toolbar is displayed which allows the user to launch conferencing facilities. Each conferencing facility available is represented by a button in the toolbar. These buttons are implemented by the classes ChatButton (which is used to start or join a multi-party chat conference, DiaryButton (which is used to display a team members diary), EMailButton (which is used to send e-mail to a team member), HomePageButton (which requests the web browser hosting the team worker applet to display the team members home page), MessageButton (which is used to send a direct message—pops up on the recipients display—to another team member), PhoneButton (used to display another team members phone number), and JoggleButton (which launches a multi-party game called Joggle).

Some of these facilities are implemented purely by the client (for example the display of the phone number and home page), and others are true multi-party conferencing applications that require the team worker infrastructure that is the subject of the application.

When one of the conference buttons is pressed (for example, the chat button), new ConferenceView (36C), Model (36A) and Controller (36D) instances are created to manage the conference. The actual classes created are subclasses of the ConferencingAppletModel, View and Controller classes that are particular to the given type of conference. In this case we would create instances of the ChatConferenceModel, View and Controller classes. These classes are used to manage the chat in the manner previously described and illustrated in the Figure.

The invention is not restricted to chalkboard applications, another embodiment of the invention could be a three dimensional molecular modelling application as used by chemists and biologists and in which the use of the invention would be particularly advantageous. The model data (60) may represent the types, positions and connections of various atoms in a molecule. The conference view object would be able to view the molecule in any orientation and the conference controller object would allow the user to manipulate and change the atoms. Such an application is particularly processor intensive due to the high resolution images use and the model data (60) needs to be quickly accessible to the client computer and storing the model data on the client computer is the main practical solution. This leads to the problems outlined in the introduction to the specification which the application addresses.

Due to the nature of programming it is quite possible to implement the invention using a programming language other than an object orientated programming language.

In the object orientated environment it is possible for the a client computer to participate in more than one conference.

Of course the server computer may in fact be connected to any number of client computers not just three as stated in the example. Further it is not necessary to use the computers given as examples as the invention may be performed using other types of computer connected in different configurations.

In summary there is described a personal conferencing method and system for a client/server environment. The server stores conference model data (60) such as a shared chalkboard or a molecular model and each client has a copy of the conference model data (60). When one of said clients edits the model it creates an instruction for operating on the model and sends the instruction to the server. The server operates (62) on its conference model data on receipt of the instruction and resends the instruction to each of the clients and each client performs the same operation (62) on their respective copies of the conference data model (60). Whereby after a plurality of different operating instructions from different clients the respective copies of the conference model data (60) are equivalent.

What is claimed is:

1. A method for controlling a personal conference between a server (30) and one or more clients (32A,32B, 32C) for sharing common conference model data (60) comprising:

storing the conference model data (60) on each client in the conference;

generating, at a client, a pre-instruction representing an operation on the conference model data (60) and sending the pre-instruction from the client to the server (30);

receiving at the server the pre-instruction from the client;

broadcasting an instruction, in response to the pre-instruction, for operating on the conference model from the server to all the clients; and operating on the conference model, at each client, according the broadcast instruction;

whereby the server provides a centralized meeting place for clients to advertise and participate in shared work and whereby each client receives broadcast instructions in the same order and performs operations on its respective conference data model in the same order so that all copies of the conference model data remain consistent.

2. A method as claimed in claim 1 further whereby the pre-instructions are received by the server in a particular order and the instructions broadcast in the same order.

3. A method as claimed in claim 1 further comprising:

storing the conference model data on the server computer;

identifying a request from a new client wishing to participate in the conference;

sending said server stored conference model data to the new client computer.

4. A method as claimed in claim 1 further comprising:

storing a client program on the server, said program coded in a universal machine hosted byte code;

identifying a request from a new client wishing to partake in the conference; and sending the same client program to the requesting client regardless of the type of operating system used by the client.

5. A method as claimed in claim 4 wherein the clients connect to the server over a TCP/IP network and the client use a virtual machine in a TCP/IP browser to operate the client program.

6. A method as claimed in claim 5 wherein each instruction comprises operation code for the client program.

7. A personal conferencing system for sharing common conference model data (60) between a server (30) and one or more clients (32A,32B, 32C), two or more clients (32A, 32B, 33C), each client comprising:

means for storing the conference model data (60);

means for generating a pre-instruction representing an operation for performance on the stored conference model data (60);

means for sending the pre-instruction to the server (30);

means for receiving an instruction from the server;

means for operating on the conference model according the received instruction;

said server comprising:

means for receiving the pre-instruction from a client; and means for broadcasting an instruction to all clients in the personal conferencing system;

whereby the server provides a centralized meeting place for clients to advertise and participate in shared work and whereby each client receives instructions and performs operations on its respective conference data model in the same order as other clients so that all copies of the conference model data remain consistent.

8. A system as claimed in claim 7 further comprising means for receiving the pre-instructions in a particular order and means for broadcasting the instructions in the same particular order.

9. A system as claimed in claim 7 further comprising:

means for storing the conference model data on the server computer;

means for identifying a request from a new client wishing to participate in the conference;

means for sending said server stored conference model data to the new client computer.

10. A system as claimed in claim 7 further comprising:

means for storing a client program on the server, said program coded in a universal machine hosted byte code;

means for identifying a request from a new client wishing to partake in the conference; and means for sending the same client program to the requesting client regardless of the type of operating system used by the client.

11. A system as claimed in claim 10 wherein each client connects to the server over a TCP/IP network and each client comprises a virtual machine and a TCP/IP browser to operate the client program.

12. A method as claimed in claim 7 wherein each confirmation instruction comprises operation code for the client program.

13. A computer program product, stored on a computer-readable storage medium, for executing computer program instructions to carry out the steps of a method for controlling a personal conference between a server (30) and one or more clients (32A,32B, 32C) for sharing common conference model data (60); said method steps comprising:

storing conference model data (60) on each client in the conference;

generating, at a client, a pre-instruction representing an operation on the conference model data (60);

sending the pre-instruction from the client to the server (30);

receiving at the server the pre-instruction from the client;

broadcasting a corresponding instruction from the server to all the clients in response to the pre-instruction; and operating on the conference model, at each client, according the received instruction;

whereby the server provides a centralized meeting place for clients to advertise and participate in shared work and whereby each client receives instructions and performs operations on its respective conference data model in the same order as other clients so that all copies of the conference model data remain consistent.

14. A computer program product as claimed in claim 13 further whereby the pre-instructions are received by the server in a particular order and the instructions broadcast in the same particular order.

15. A computer program product as claimed in claim 13 further comprising:

storing the conference model data on the server computer;

identifying a request from a new client wishing to participate in the conference;

sending said server stored conference model data to the new client computer.

16. A computer program product as claimed in claim 13 further comprising:

storing a client program on the server, said program coded in a universal machine hosted byte code;

identifying a request from a new client wishing to partake in the conference; and sending the same client program to the requesting client regardless of the type of operating system used by the client.

17. A method as claimed in claim 16 wherein the clients connect to the server over a TCP/IP network and the client use a virtual machine in a TCP/IP browser to operate the client program.

18. A method as claimed in claim 13 wherein each confirmation instruction comprises operation code for the client program.

* * * * *